United States Patent [19]

Stadtmueller

[11] Patent Number: 5,891,297
[45] Date of Patent: Apr. 6, 1999

[54] SYSTEM AND METHOD FOR PEELING A POLARIZED FILM

[75] Inventor: Gary F. Stadtmueller, Vancouver, Wash.

[73] Assignees: Sharp Microelectronics Technology, Inc., Camas, Wash.; Sharp Kabushiki Kaisha, Osaka, Japan

[21] Appl. No.: 960,011

[22] Filed: Oct. 29, 1997

[51] Int. Cl.⁶ .................................................. B32B 35/00

[52] U.S. Cl. .................... 156/344; 156/584; 271/280; 271/281; 271/285

[58] Field of Search .................................. 156/344, 584; 271/280, 281, 285

[56] References Cited

U.S. PATENT DOCUMENTS

| | | | |
|---|---|---|---|
| 4,670,085 | 6/1987 | Van der Meer et al. | 226/5 |
| 4,880,488 | 11/1989 | Matsuo et al. | 156/344 |
| 5,169,474 | 12/1992 | Binder | 156/584 |
| 5,540,809 | 7/1996 | Ida et al. | 156/584 |

*Primary Examiner*—David A. Simmons
*Assistant Examiner*—Robert R. Koehler
*Attorney, Agent, or Firm*—Gerald Maliszewski; David Ripma

[57] ABSTRACT

A polarizer film tool, for removal of polarizer film from an LCD panel, is provided. The tool includes a take-up cylinder whose rotational action pulls the film from the LCD and wraps the removed film around itself. Two padded rotating stabilization cylinders guide the LCD in a preferred path through the tool to equally distribute the force used to hold the LCD as the polarizer film is pulled from its surface. The padded cylinders allow for deviations in the preferred path to accommodate any discrete parts mounted on the LCD that have a higher profile than the LCD surface. A method for removing the polarizer film with the above-mentioned tool is also provided.

14 Claims, 5 Drawing Sheets

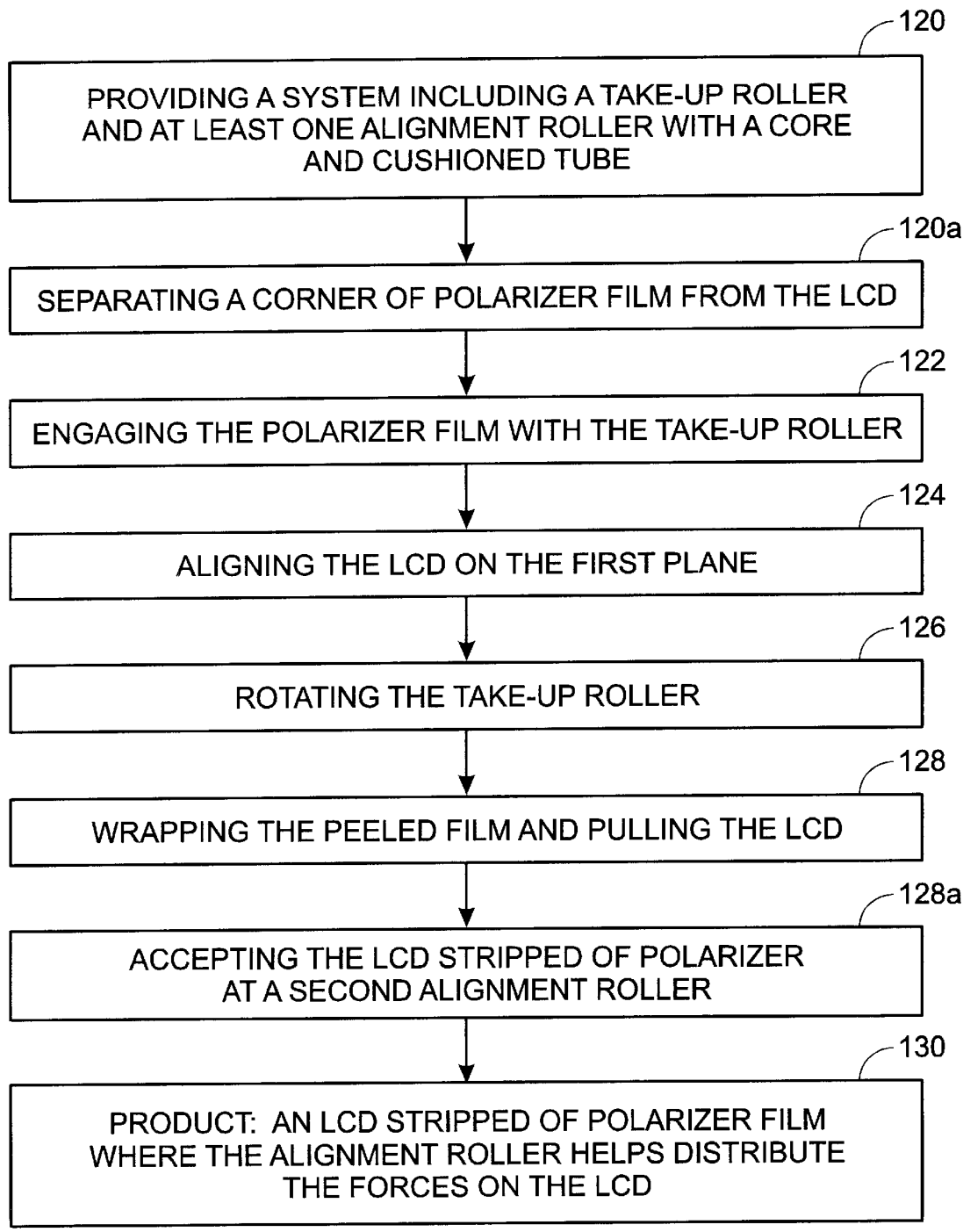

SYSTEM AND METHOD FOR PEELING A POLARIZED FILM

BACKGROUND AND SUMMARY OF THE INVENTION

This invention relates generally to the fabrication of liquid crystal displays (LCDs) and, more particularly, to a system and method of peeling a sheet of polarizer film from an LCD display in a repair procedure.

Technological advances in design and fabrication have permitted LCDs to replace cathode ray tubes (CRT). The size, weight, and power consumption of the CRT have limited its use in both portable and large screen electronic products. The pixel resolution of the LCD continues to improve, making both large and small screen displays realizable. As LCD costs continue to decrease, it has increasingly become an economical competitor to the CRT.

LCDs operate by controlling the polarity of a light through a transmissive dual phase (liquid/crystal) medium. The LCD allows light of substantially only one polarity to pass through the display, the specific polarity varies for different systems. The liquid crystal molecules on one side of a display are aligned in a first direction, while the liquid crystal molecules on the other side of the screen are typically aligned in a perpendicular direction. Light must, therefore, undergo a 90 degree rotation in polarity as it passes through the display. Sheets of polarizing film are applied to the outside surface of the displays with a polarization matching the initial liquid crystal alignment. The LCD is designed to "twist" light 90 degrees, to pass through the display in one state, and to rotate the light an additional 90 degrees in a second state, so that light is absorbed by the polarizer. In this manner, the intensity of every pixel of light of the LCD is controlled.

A typical electronics device using an LCD undergoes many stages of fabrication and testing before the product is complete. It is not unusual for the pliable thin sheets of polarizer film covering the hard glass surfaces of the LCD to become damaged or scratched in production. Then, the damaged polarizer film must be removed and replaced with another film. Further, in use of the electronic product the polarizer film, or LCD may become damaged so that the polarizer film must be removed in the repair process.

Figs. 1a and 1b illustrate a tool 10 to remove a sheet of polarizer film 12 from an LCD 14 (prior art). An operator begins the process by pulling a corner of the film from the LCD, and inserting the corner into a slot 16 in tool 10 (Fig. 1b). The operator then rotates tool 10 to separate polarizer film 12 from LCD 14. Unfortunately, tool 10 provides no alignment between tool 10 and LCD 14, so that film 12 is pulled unevenly, or tool 10 directly touches areas of LCD 14. LCD 14 is often damaged as the unequal pressures applied during the removal of film 12 permanently disturb the alignment of liquid crystal molecules, or displace the cell gap between the two sheets of glass. This problem is exacerbated by the necessity of the operator to start and stop the film peeling process to re-grip the handle of tool 10 and to realign tool 10 with LCD 14.

It is well known to fabricate LCD 14 with discrete electronic components 18 placed around the periphery. Discrete components 18 are typically needed for functions requiring the high electron mobility of single crystal transistor devices. As is well known, LCDs are typically fabricated with amorphous or polycrystalline silicon that form transistors having poor electron mobility. Because of the high profile of discrete components 18, relative to the flat surface of LCD 14, discrete components 18 are often damaged by tool 10 in the process of removing film 12.

It would be advantageous if a tool could be developed to properly align an LCD with respect to the removal tool in the process of pulling a polarizer film from an LCD.

It would be advantageous if a process could be developed for protecting the surface of the LCD, and any peripherally mounted parts, when a polarizer film is removed from an LCD.

It would be advantageous if a film removal system could be developed to minimize or eliminate any direct pressure on the surface of the LCD in the process of peeling a polarizer film from the LCD surface.

It would be advantageous if a tool could be developed to peel the polarizer film from an LCD in one continuous motion to minimize the cell gap displacement between the two plates of LCD glass.

Accordingly, a system for peeling a sheet of polarizer film adhered to a liquid crystal display (LCD) panel, is provided. The system comprises a take-up roller having a rotational axis and a surface to accept polarizer film as it is peeled. The rotation of the take-up roller peels the polarizer from the LCD and advances the position of the LCD panel along a first plane tangent to the take-up roller surface. The system also comprises at least one alignment roller having a rotational axis parallel to the rotational axis of the take-up roller, and including a cylindrical non-compressible core with a surface. The first alignment roller also includes a cushioned tube having an inside surface adjoining the core and an outside surface. The first alignment roller aligns the LCD in the first plane, which is tangent to the compressed outside surface of the cushioned tube when the polarizer film is engaged with the take-up roller. In this manner, alignment in the first plane helps distribute forces on the LCD more equally as the polarizer is peeled.

The preferred embodiment of the invention further comprises a second alignment roller having a rotational axis parallel to the rotational axis of the take-up roller, and including a cylindrical non-compressible core with a surface. The second alignment roller includes a cushioned tube having an inside surface adjoining the core and an outside surface. The second alignment roller aligns the LCD in the first plane, which is tangent to the compressed outside surface of the second alignment roller cushioned tube when the polarizer film is engaged with the take-up roller. The second alignment roller acts to further distribute the forces on the LCD, and to control the alignment of the LCD in the first plane after it has passed the take-up roller and been stripped of polarizer. The first alignment roller acts to align the LCD in the first plane as it reaches the take-up roller.

The system also includes a slot along the surface of the take-up roller to accept a corner of the polarizer film, initializing the peeling process. A crank is attached to the take-up roller so that the rotational axis of the take-up roller is aligned with the rotational axis of the crank. The crank permits the operator to apply constant rotation to the take-up roller so that the LCD is not exposed to "jerky" start-and-stop motions which stress the LCD glass and liquid crystal medium by displacing the cell gap between the LCD glass sheets.

Typically, the first and second alignment roller cushioned tubes are polyethylene having an uncompressed thickness, between the inside and outside surfaces, of approximately 0.25 inches, to accommodate any peripheral parts along the edge of the LCD panel. Under compression, when the LCD is aligned in the first plane, the polyethylene compresses approximately 0.05 inches so that the shortest distance between the first plane, as it intersects either the first or second alignment roller, and the alignment roller core surface is in the range between 0.190 and 0.210 inches. In this manner, the cushioned tubes are compressed hard enough to distribute the forces along the LCD surface, but compressed light enough to accommodate the profile of peripherally mounted parts.

In a system including a take-up roller and at least one alignment roller having a rotational axis parallel to the rotational axis of the take-up roller, and including a cylindrical non-compressible core with a surface, and a cushioned tube having an inside surface adjoining the core and an outside surface, a method of peeling polarizer film adhered to an LCD panel, is provided. The method comprises the steps of:

a) engaging the polarizer film with the take-up roller;
b) aligning the LCD on a first plane tangent to the take-up roller and to the compressed outside surface of the first alignment roller cushioned tube;
c) rotating the take-up roller; and
d) simultaneously wrapping polarizer film peeled from the LCD around the take-up roller, and pulling the LCD along the first plane past the take-up roller, whereby the alignment roller helps distribute the forces on the LCD as the polarizer is peeled.

BRIEF DESCRIPTION OF THE DRAWINGS

FIG. 6 is a flow chart illustrating the present invention method for peeling polarizer film adhered to an LCD panel.

DETAILED DESCRIPTION OF THE PREFERRED EMBODIMENTS

Figure 1A:
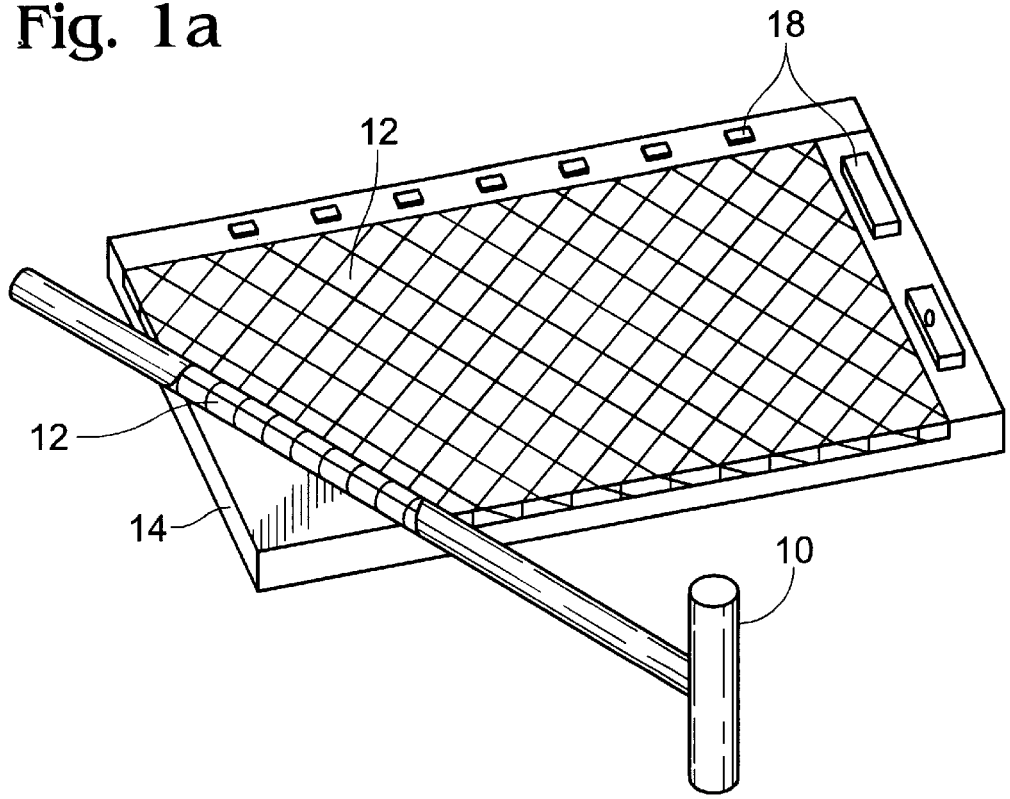
Figs. 1a and 1b illustrate a tool to remove a sheet of polarizer film from an LCD (prior art).
Figure 1B:
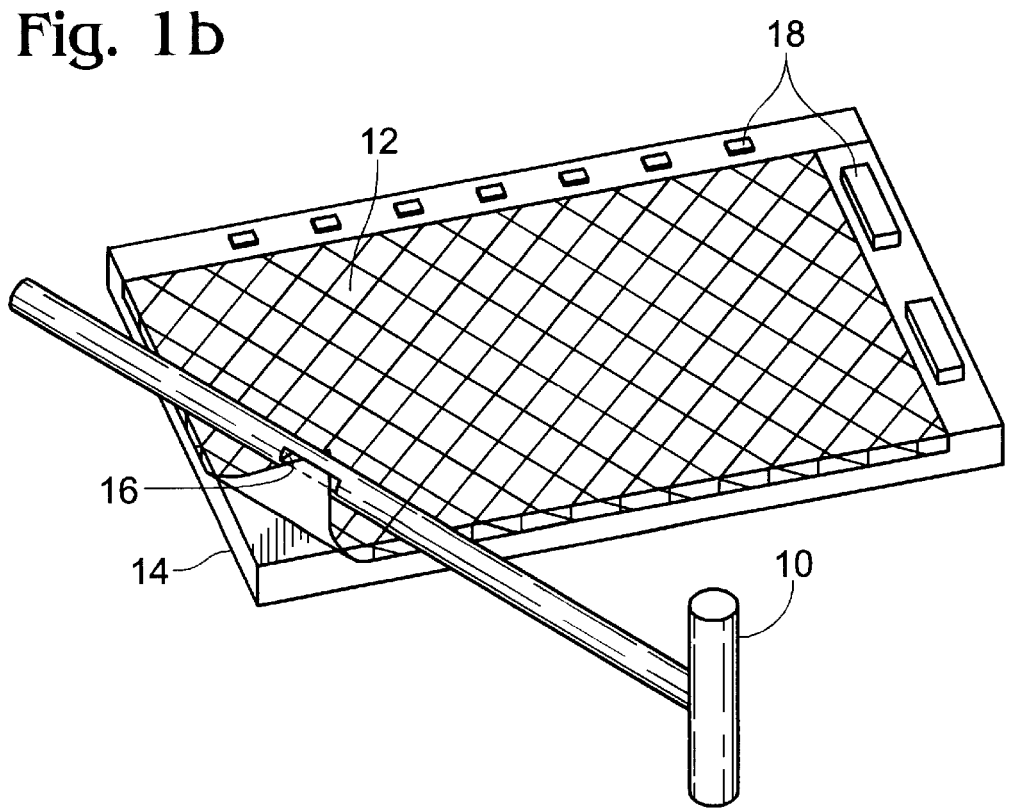
Figure 2:
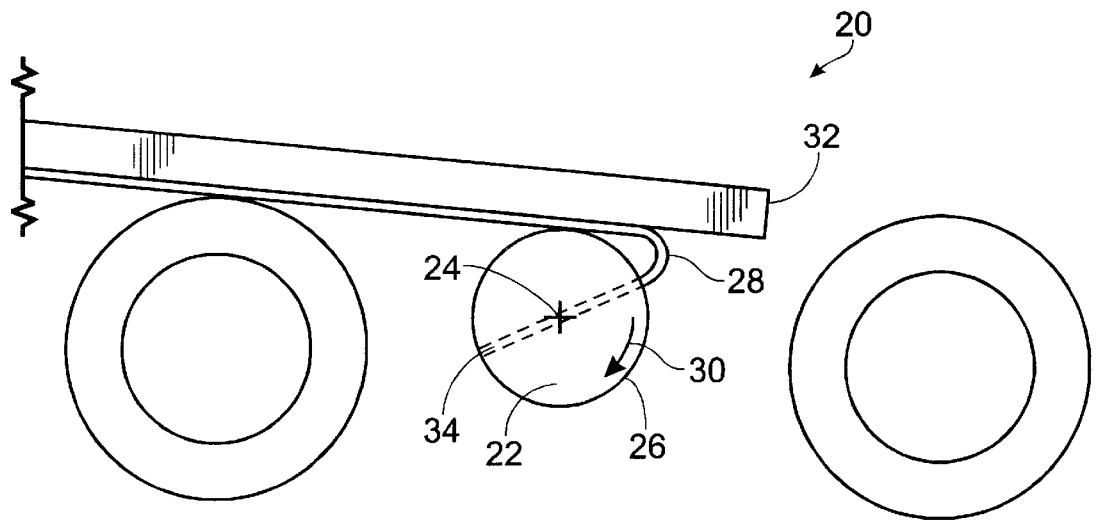
FIG. 2 illustrates an end view of the present invention system for peeling a sheet of polarizer film adhered to a liquid crystal display (LCD) panel.

FIG. 2 illustrates an end view of the present invention system 20 for peeling a sheet of polarizer film adhered to a liquid crystal display (LCD) panel. The system comprises a take-up roller 22 having a rotational axis 24 and a surface 26 to accept polarizer film 28 as it is peeled. The rotation of take-up roller 22 is represented by reference designator 30. Specifically, FIG. 2 illustrates the initial engagement of polarizer 28 with take-up roller 22. Typically, at least one polarizer film 28 corner is provided, which an operator peels to begin the process. Take-up roller 22 has a slot, represented by reference designator 34, in surface 26 along rotational axis 24 to accept the corner of polarizer 28. Slot 34 is approximately at the midpoint along the length of take-up roller 22, several inches from the end of take-up roller 22 shown in FIG. 2. Therefore, slot 34 is represented with dotted lines. Slot 34 permits polarizer film 28 to be easily engagable with take-up roller 22. Alternately, polarizer 28 is attached to take-up roller 22 with other engagement mechanisms (not shown). Until film 28 is firmly engaged with a rotating take-up roller 22, system 20 is not yet loaded, and LCD 32 is not aligned in the preferred plane of alignment for peeling (see FIG. 3).

Figure 3:
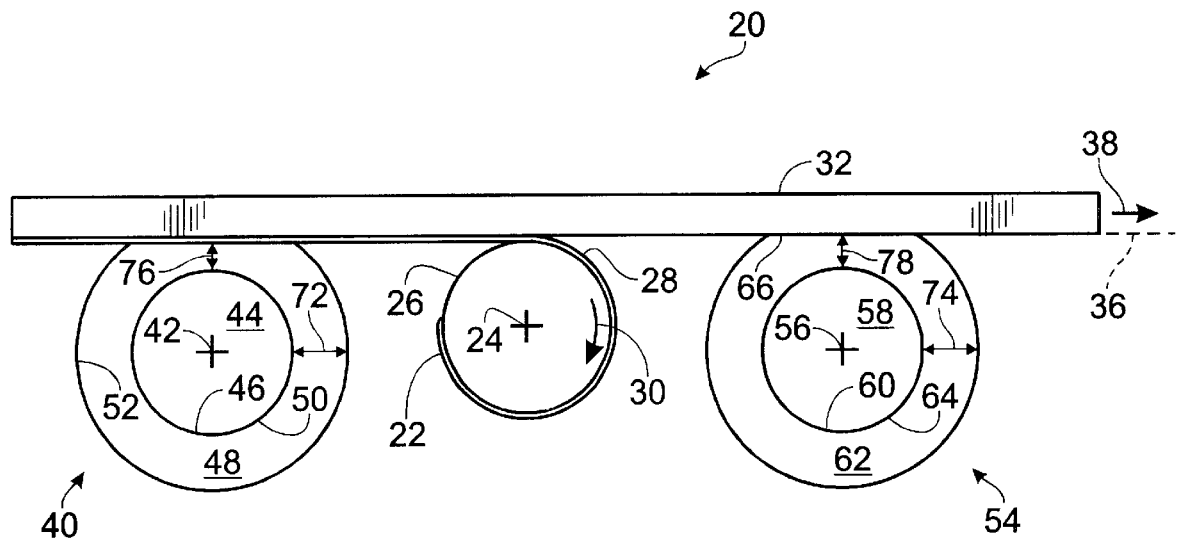
FIG. 3 illustrates the system of the present invention for peeling polarizer from an LCD.

FIG. 3 illustrates the system of the present invention for peeling polarizer 28 from LCD 32. In addition, the position of LCD panel 32 is being advanced along a first plane, represented by reference designator 36, which is tangent to take-up roller surface 26. The direction of advance is represented by reference designator 38.

System 20 comprises at least one alignment roller 40 having a rotational axis 42 parallel to rotational axis 24 of take-up roller 22. First alignment roller 40 includes a cylindrical non-compressible core 44 with a surface 46, and a cushioned tube 48 having an inside surface 50 adjoining core 44 and an outside surface 52. First alignment roller 40 aligns LCD 32 in first plane 36, which is tangent to compressed outside surface 52 of cushioned tube 48 when polarizer film 28 is engaged with take-up roller 22. Alignment in first plane 36 helps distribute forces on LCD 32 more equally as polarizer 28 is peeled.

The preferred embodiment of the invention further comprises a second alignment roller 54 having a rotational axis 56 parallel to rotational axis 24 of take-up roller 22. Second alignment roller 54 includes a cylindrical non-compressible core 58 with a surface 60, and a cushioned tube 62 having an inside surface 64 adjoining core 58 and an outside surface 66. Reference designator 66 marks an area of outside surface 66 under compression from LCD 32. Second alignment roller 54 aligns LCD 32 in first plane 36, which is tangent to the compressed outside surface 66 of second alignment roller cushioned tube 62 when polarizer film 28 is engaged with take-up roller 22. Second alignment roller 54 acts to further distribute the forces on LCD 32 and to control the alignment of LCD 32 in first plane 36. LCD 32 is in close proximity to take-up roller 22 when aligned in first plane 36 to peel polarizer 28, and limit the maximum travel, or deviation of the surface of LCD 32 from first plane 36. Preferably, the glass surface of LCD 32 does not contact take-up roller 22 to minimize potential damage to LCD 32.

Figure 4:
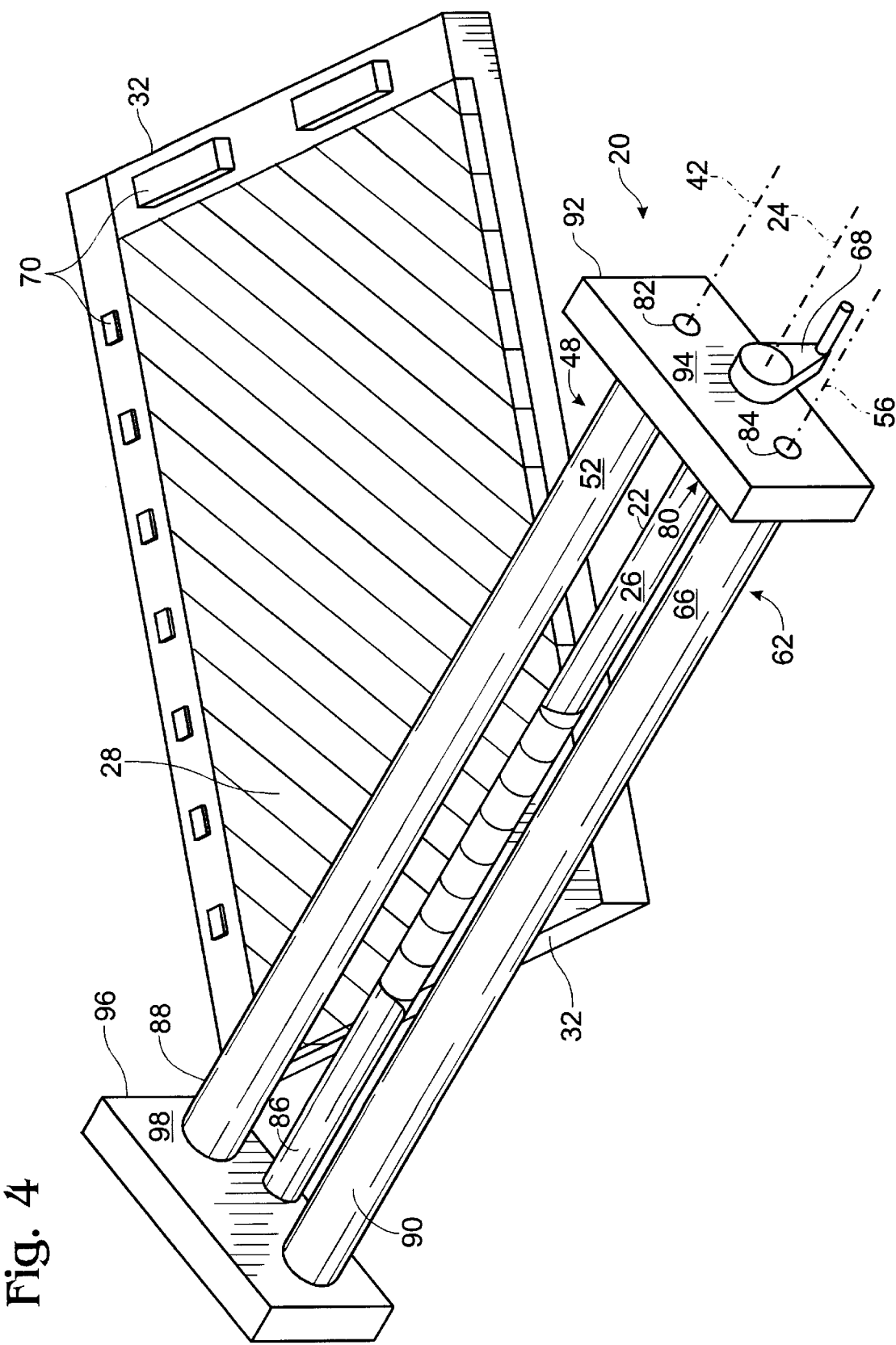
FIG. 4 illustrates a perspective view of the system of the present invention.

FIG. 4 illustrates a perspective view of system 20 of the present invention. A crank 68 has a rotational axis, with crank 68 being attached to take-up roller 22 so that rotational axis 24 of take-up roller 22 is aligned with the rotational axis of crank 68. Both rotational axes are, therefore, represented with reference designator 24. Crank 68 permits take-up roller 22 to be turned in a continuous motion to reduce the stress of start-and-stop motions on LCD 32. It is believed that stresses produced by prior art "T" handle rollers cause a "rainbow" effect of colors visible on some LCDs that have had polarizer removed.

Typically, LCD 32 has discrete electronic components 70 mounted on the periphery of display 32. First and second alignment roller cushioned tubes 48 and 62 are polyethylene. Referring again to FIG. 3, cushioned tube 48 has an uncompressed thickness 72, between inside 50 and outside 52 surfaces, of approximately 0.25 inches. Likewise, cushioned tube 62 has an uncompressed thickness 74, between inside 64 and outside 66 surfaces, of approximately 0.25 inches. Because cushioned tubes 48 and 62 are not compressed as far as their respective cores surfaces 46 and 60, peripheral parts 70 are accommodated while maintaining even pressure on LCD panel 32. Further, cushioned tubes 48 and 62 permit LCD 32 to slightly deviate from first plane 36 (FIG. 3) as peripheral parts 70 pass by take-up roller 22.

The shortest distance 76 between first plane 36, as it intersects first alignment roller 40, and first alignment roller core surface 46 is in the range between 0.190 and 0.210 inches. Likewise, the shortest distance 78 between first plane 36, as it intersects second alignment roller 54, and second alignment roller core surface 60 is in the range between 0.190 and 0.210 inches. Cushioned tubes 48 and 62 are compressed hard enough to distribute the forces along the surface of LCD 32, and light enough to accommodate the profile of peripherally mounted parts 70 as they pass by rollers 22, 40, and 54.

Returning again the FIG. 4, take-up roller 22, first alignment roller 40, and second alignment roller 54 have, respectively, proximal ends 80, 82, and 84, and distal axis ends 86, 88, and 90. System 20 further comprises a first end cap 92 having a surface 94 orthogonal to roller axes 24, 42, and 56 to accept proximal roller ends 80, 82, and 84. A second end cap 96 has a surface 98 orthogonal to roller axes 24, 42, and 56 to accept distal roller ends 86, 88, and 90. End caps 92 and 96 keep roller axes 24, 42, and 56 in parallel alignment.

Figure 5:
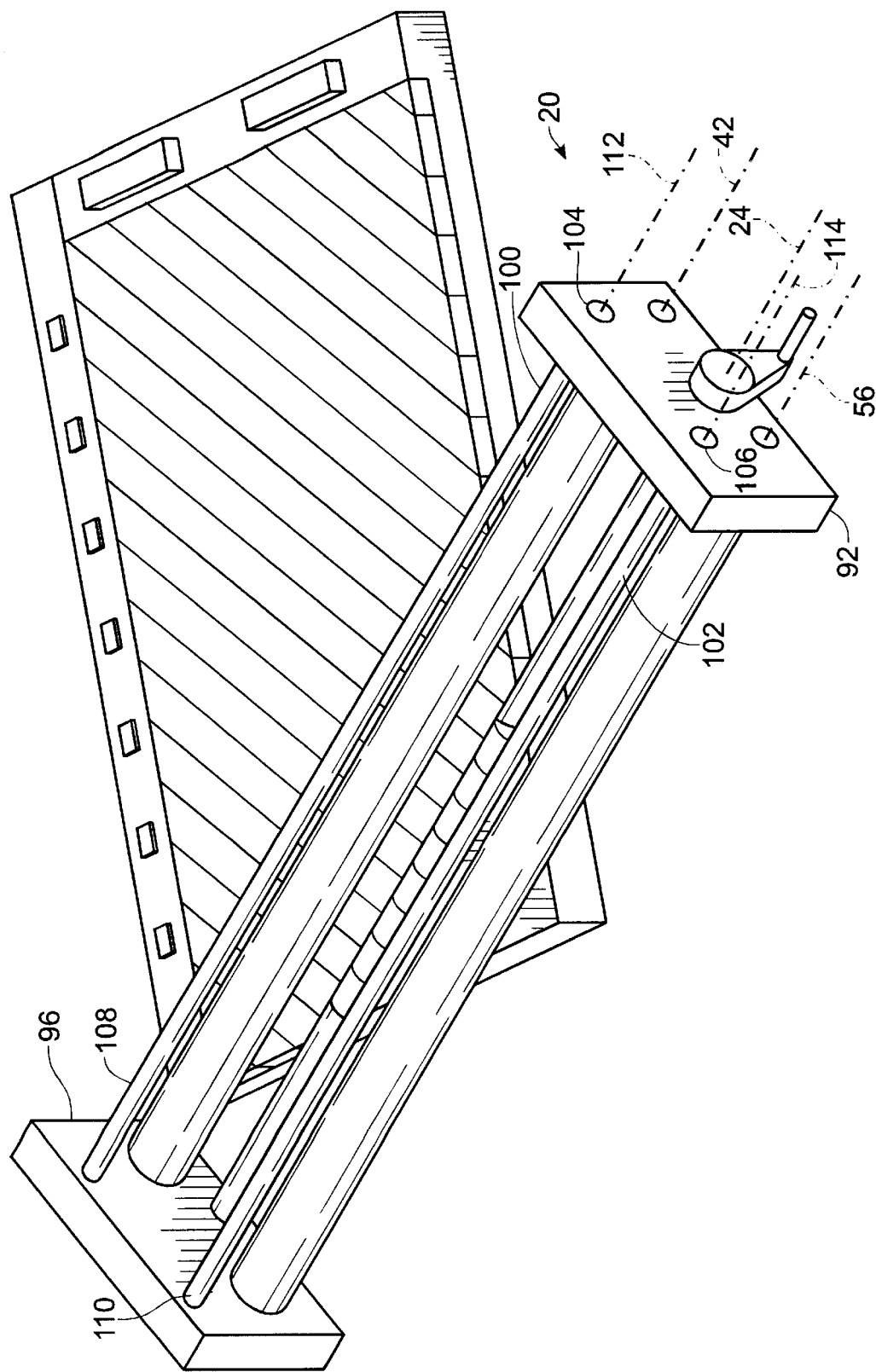
FIG. 5 illustrates aspects of the system of the present invention, as shown in FIG. 4, in greater detail.

FIG. 5 illustrates aspects of system 20 of the present invention, as shown in FIG. 4, in greater detail. System 20 further comprises at least two support rods 100 and 102 having, respectively, proximal ends 104 and 106, and distal ends 108 and 110. First and second rod axes 112 and 114 are parallel to roller axes 24, 42, and 56. Rod proximal ends 104 and 106 are attached to first end cap 92 and rod distal ends 108 and 110 are attached to second end cap 96. Support rods 100 and 102 maintain the alignment of end caps 92 and 96.

FIG. 6 is a flow chart illustrating the present invention method for peeling polarizer film adhered to an LCD panel. Step 120 provides a system including a take-up roller and at least one alignment roller having a rotational axis parallel to the rotational axis of the take-up roller, and including a cylindrical non-compressible core with a surface, and a cushioned tube having an inside surface adjoining the core, and an outside surface. Step 122 engages the polarizer film with the take-up roller. Step 124 aligns the LCD on a first plane tangent to the take-up roller and to the compressed outside surface of the first alignment roller cushioned tube. Step 126 rotates the take-up roller. Step 128 simultaneously wraps polarizer film peeled from the LCD around the take-up roller, and pulls the LCD along the first plane past the take-up roller. Step 130 is a product, where the alignment roller helps distribute the forces on the LCD as the polarizer is peeled.

In some aspects of the invention, the take-up roller has a slot in its surface along the rotational axis, and includes the further step, preceding Step 122, of 120a. Step 120a separates a corner of the sheet of polarizer from the LCD. Then, Step 122 includes inserting the corner into the slot of the take-up roller, whereby the polarizer is engaged with the take-up roller.

In the preferred embodiment, a second alignment roller is provided, having a rotational axis parallel to the rotational axis of the take-up roller, and including a cylindrical non-compressible core with a surface, and a cushioned tube having an inside surface adjoining the core, and an outside surface. A further step, Step 128a, then follows Step 126. Step 128a accepts the LCD, stripped of polarizer, on the first plane tangent to the compressed outside surface of the second alignment roller cushioned tube.

In some aspects of the invention Steps 124 and 128a include using a polyethylene cushioned tube having a thickness of approximately 0.25 inches between the inside and outside surfaces. These steps also include compressing the cushioned tube approximately 0.05 inches to align the LCD in the first plane.

In the preferred embodiment of the invention a crank is provided having a rotational axis aligned with the rotational axis of the take-up roller. Then, Step 126 includes using the crank to rotate the take-up roller. In this manner, the take-up roller is continuously rotated to eliminate additional forces on the LCD panel related to starting the peeling process.

The system and method of the present invention provide an improved means of removing polarizer film from an LCD panel. The present invention permits the peeling to be done in a continuous motion so that the LCD does not undergo the stress of several starts in the peeling process, as the force needed to start the peeling is greater than the force needed to maintain the peeling. Further, the alignment rollers keep the LCD in proper alignment with the take-up roller so that the take-up roller does not press against portions of the LCD. The cushioned alignment rollers also act to a accommodate peripheral mounted parts on the LCD, and to slightly modify the LCD from the first plane as the peripheral parts pass by the take-up roller. Other variations and embodiments will occur to those skilled in the art.

What is claimed is:

1. A system for peeling a sheet of polarizer film adhered to a liquid crystal display (LCD) panel, the system comprising:

a take-up roller having a rotational axis and a surface to accept polarizer film as it is peeled, with the rotation of said take-up roller peeling the polarizer from the LCD and advancing the position of the LCD panel along a first plane tangent to said take-up roller surface;

at least one alignment roller having a rotational axis parallel to the rotational axis of said take-up roller, and including a cylindrical non-compressible core with a surface, and a cushioned tube having an inside surface adjoining said core and an outside surface, said first alignment roller aligning the LCD in the first plane, which is tangent to the compressed outside surface of said cushioned tube when the polarizer film is engaged with said take-up roller, whereby alignment in the first plane helps distribute forces on the LCD more equally as the polarizer is peeled.

2. A system as in claim 1 further comprising a second alignment roller having a rotational axis parallel to the rotational axis of said take-up roller, and including a cylindrical non-compressible core with a surface, and a cushioned tube having an inside surface adjoining said core and an outside surface, said second alignment roller aligning the LCD in the first plane, which is tangent to the compressed outside surface of said second alignment roller cushioned tube when the polarizer film is engaged with said take-up roller, whereby said second alignment roller acts to further distribute the forces on the LCD and to control the alignment of the LCD in the first plane.

3. A system as in claim 1 wherein at least one polarizer film corner is provided, and in which said take-up roller has a slot in said take-up roller surface along the rotational axis to accept the polarizer corner, whereby the polarizer film is easily engagable with said take-up roller.

4. A system as in claim 1 further comprising a crank having a rotational axis, with said crank being attached to said take-up roller so that the rotational axis of said take-up roller is aligned with the rotational axis of said crank, whereby said crank permits the take-up roller to be turned in a continuous motion, reducing the stress of start-and-stop motions on the LCD.

5. A system as in claim 2 wherein the LCD has discrete electronic components mounted on the periphery of the display, in which said first and second alignment roller cushioned tubes are polyethylene having an uncompressed thickness, between the inside and outside surfaces, of approximately 0.25 inches, whereby the peripheral parts are accommodated while maintaining even pressure on the LCD panel.

6. A system as in claim 2 in which the shortest distance between the first plane, as it intersects said first alignment roller, and said first alignment roller core surface is in the range between 0.190 and 0.210 inches, and in which the shortest distance between the first plane, as it intersects said second alignment roller, and said second alignment roller core surface is in the range between 0.190 and 0.210 inches, whereby said cushioned tubes are compressed hard enough to distribute the forces along the LCD surface, and light enough to accommodate the profile of peripherally mounted parts.

7. A system as in claim 2 wherein said take-up and alignment rollers have proximal and distal axis ends, and the system further comprising a first end cap having a surface orthogonal to the roller axes to accept said proximal roller ends, and a second end cap having a surface orthogonal to said roller axes to accept said distal roller ends, whereby said end caps keep said roller axes in parallel alignment.

8. A system as in claim 7 further comprising at least two support rods having proximal and distal ends and rod axes parallel to the roller axes, said rod proximal ends attached to said first end cap and said rod distal ends attached to said second end cap, whereby said support rods maintain the alignment of said end caps.

9. In a system including a take-up roller and at least one alignment roller having a rotational axis parallel to the rotational axis of the take-up roller, and including a cylindrical non-compressible core with a surface, and a cushioned tube having an inside surface adjoining the core and an outside surface, a method for peeling polarizer film adhered to an LCD panel comprising the steps of:

a) engaging the polarizer film with the take-up roller;

b) aligning the LCD on a first plane tangent to the take-up roller and to the compressed outside surface of the first alignment roller cushioned tube;

c) rotating the take-up roller; and d) simultaneously wrapping polarizer film peeled from the LCD around the take-up roller, and pulling the LCD along the first plane past the take-up roller, whereby the alignment roller helps distribute the forces on the LCD as the polarizer is peeled.

10. A method as in claim 9 wherein the take-up roller has a slot in its surface along the rotational axis, and including the further step, preceding Step a), of:

$a_1$) separating a corner of the sheet of polarizer from the LCD; and in which Step a) includes inserting the corner into the slot of the take-up roller, whereby the polarizer is engaged with the take-up roller.

11. A method as in claim 9 wherein a second alignment roller, having a rotational axis parallel to the rotational axis of the take-up roller, and including a cylindrical non-compressible core with a surface, and a cushioned tube having an inside surface adjoining the core and an outside surface, is provided, and including the further step, following Step d), of:

e) accepting the LCD, stripped of polarizer, on the first plane tangent to the compressed outside surface of the second alignment roller cushioned tube.

12. A method as in claim 11 in which Steps b) and e) included using a polyethylene cushioned tube having a thickness of approximately 0.25 inches between the inside and outside surfaces.

13. A method as in claim 11 in which Steps b) and e) include compressing the cushioned tube approximately 0.05 inches to align the LCD in the first plane.

14. A method as in claim 9 wherein a crank is provided having a rotational axis aligned with the rotational axis of the take-up roller, and in which Step c) includes using the crank to rotate the take-up roller, whereby the take-up roller is continuously rotated to eliminate additional forces on the LCD panel related to starting the peeling process.

* * * * *